United States Patent
Sahakian

[11] Patent Number: 5,374,959
[45] Date of Patent: Dec. 20, 1994

[54] METHOD OF AND DEVICE FOR ESTIMATING MOTION IN AN IMAGE

[75] Inventor: Jean-Christophe Sahakian, Orly, France

[73] Assignee: U.S. Philips Corporation, New York, N.Y.

[21] Appl. No.: 124,744

[22] Filed: Sep. 21, 1993

[30] Foreign Application Priority Data

Sep. 23, 1992 [FR] France .................................. 92 11330

[51] Int. Cl.$^5$ ............................................. H04N 7/01
[52] U.S. Cl. ..................................... 348/451; 348/702
[58] Field of Search ............... 348/699, 702, 452, 451, 348/630; H04N 7/01, 7/18

[56] References Cited

U.S. PATENT DOCUMENTS

| | | | |
|---|---|---|---|
| 4,651,211 | 3/1987 | Wackenbrock et al. | 348/699 |
| 4,811,092 | 3/1989 | Achiha et al. | 348/699 |
| 5,047,849 | 9/1991 | Hara | 348/452 |
| 5,103,295 | 4/1992 | Uwabata et al. | 348/452 |
| 5,257,102 | 10/1993 | Wilkinson | 348/446 |

*Primary Examiner*—Victor R. Kostak
*Attorney, Agent, or Firm*—Michael E. Marion

[57] ABSTRACT

For obtaining motion information by using a conventional motion estimator, a composite signal obtained from both the luminance signal and the chrominance signal is applied to this motion estimator. Based on the signals (Cb, Cr) of the two chrominance components (U, V), the contour of the colored elements of the image is extracted by means of Sobel filters (9, 10), i.e. high-pass two-dimensional filters, and the output signals of these filters are added to the luminance signal (2) in an adder (14), the resultant signal (3) being applied to the motion estimator.

20 Claims, 2 Drawing Sheets

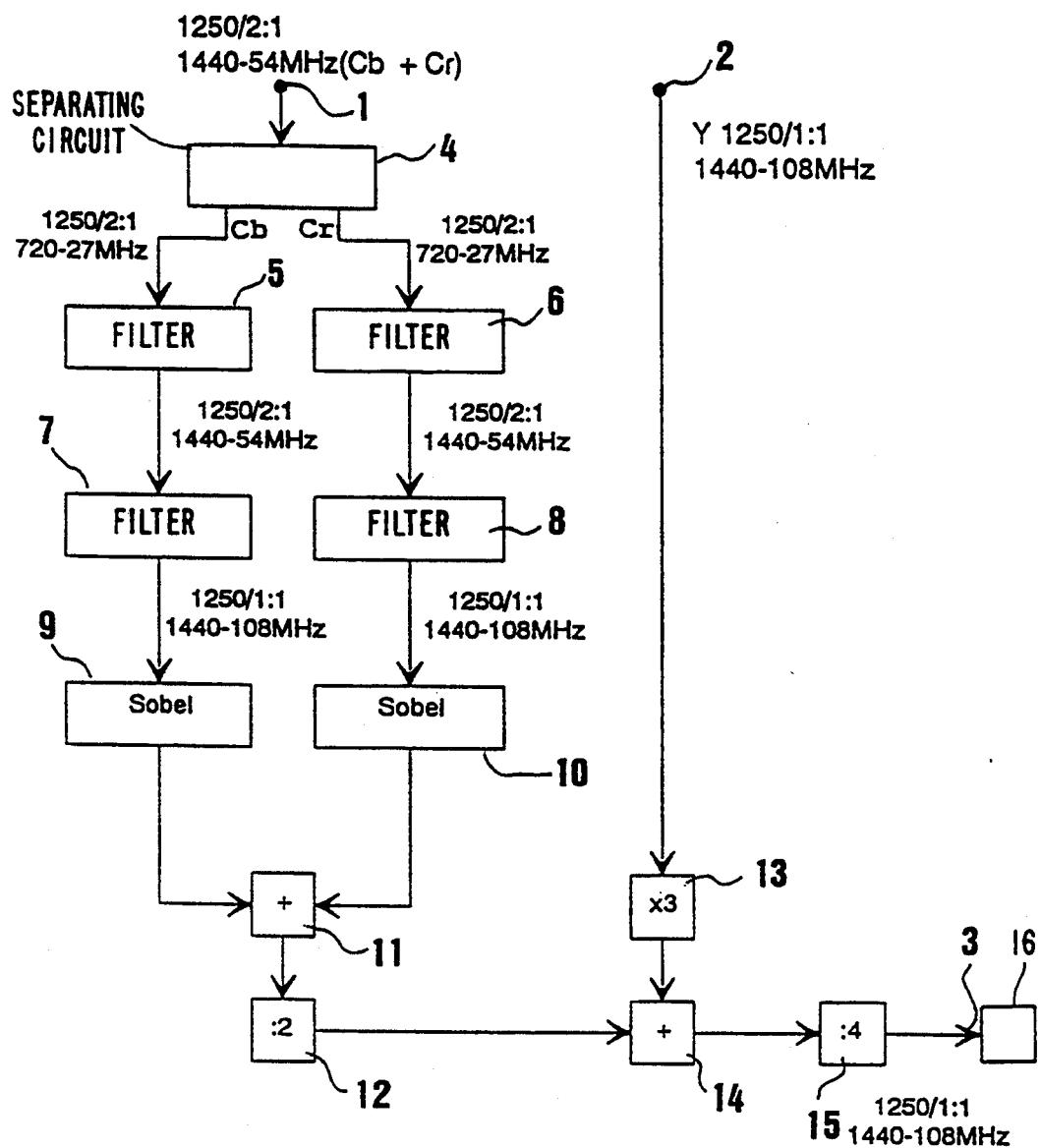

METHOD OF AND DEVICE FOR ESTIMATING MOTION IN AN IMAGE

BACKGROUND OF THE INVENTION

The invention relates to a method of estimating motion in an image by means of a motion estimator whose input receives a signal which supplies information about the pixels of the image, said image being represented by digital data comprising a luminance signal and a chrominance signal.

The invention also relates to a device provided with a motion estimator whose input receives a signal which supplies information about the pixels of an image for estimating motion in this image which is represented by digital data comprising a luminance signal and a chrominance signal.

Such a method and a device are used for reducing the digital data rate in digital television or in television using associated digital data ("DATV").

It is known to obtain motion information for elements of a television image by using a motion estimator, based on the luminance signal, which supplies a vector motion for the luminance. However, when the luminance is constant when the chrominance signal level varies (for example, when moving the camera along banners against a uniform sky, with the luminance of the banner and that of the sky being equal or substantially equal, billboards, etc.) the motion estimator will operate erroneously, which becomes manifest in a disturbing phenomenon in the reproduced image. An evident solution would be to use a second motion estimator, based on the chrominance signal, supplying a vector motion for the chrominance, and to transmit the value of the chrominance vector motion, or to weight the luminance vector by the chrominance vector.

These options have the drawback that they are difficult to realise in hardware, while they also involve a modification of the data transmission standard.

It is, inter alia, an object of the invention to provide a solution for these drawbacks.

SUMMARY OF THE INVENTION

The method according to a first aspect of the invention is thus characterized by the steps of generating a composite signal not only from the luminance signal but aim from the chrominance signal, and applying the composite signal to the input of the motion estimator.

For generating this composite signal, the chrominance signal may be filtered in a high-pass two-dimensional filter supplying the absolute value of the derivative of the signal, i.e. the contour of the colored elements of the image.

The use of a two-dimensional filter allows detection of contours in all the directions in an image.

Advantageously, a two-dimensional "Sobel" filter is used. This type of filter is one of the easiest for realising the desired function.

Advantageously, the chrominance signal is also filtered in a horizontal interpolation filter and in a vertical interpolation filter. Thereby, the sampling rate of the color samples supplied at the output of these filters is made equal to that of the luminance samples, which enables the color samples at the output of the two-dimensional filter(s) to be added, in a weighting operation, to the luminance signal, the resultant signal being applied to the motion estimator.

As the chrominance signal comprises several components, a two-dimensional filter may be used for each chrominance signal component, and the output signals of these two-dimensional filters are added together.

A device according to a second aspect of the invention comprises means for extracting from the chrominance signal, elements representing contours of colored parts of the image, and means for adding these elements to the luminance signal which is applied to the motion estimator.

Advantageously, said means for extracting the elements comprise at least a high-pass two-dimensional filter which supplies the absolute value of the derivative of the chrominance signal.

The two-dimensional filter is preferably a "Sobel" filter.

The device preferably comprises, for the chrominance signal, at least a horizontal interpolation filter and a vertical interpolation filter, and an adder circuit for adding, in a weighting operation, the signals from the two-dimensional filter to the luminance signal, the resultant signal being applied to the motion estimator.

As the chrominance signal comprises several components, the device advantageously comprises a two-dimensional filter for each chrominance signal component and an adder circuit for adding the output signals of the two-dimensional filters together.

These and other aspects of the invention will be apparent from and elucidated with reference to the embodiments described hereinafter.

BRIEF DESCRIPTION OF THE DRAWINGS

In the drawings

FIG. 1 is a block diagram of a device according to the invention.

FIG. 2 illustrates the configuration of samples treated in a Sobel filter used in the device.

DETAILED DESCRIPTION OF THE PREFERRED EMBODIMENTS OF THE INVENTION

Figure 3:
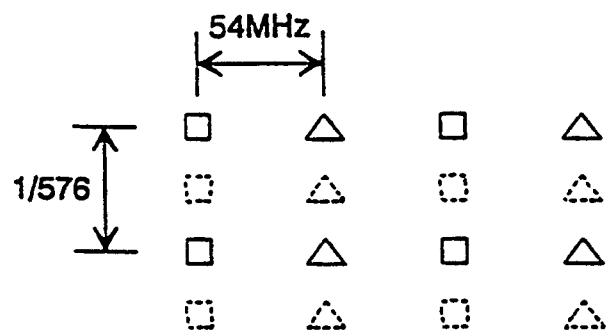
FIGS. 3 to 6 illustrate the sampling of the signals at different points in the device.

The description of the operation of the device according to the invention is a description of the method according to the invention, which will thus not be described separately.

The device whose diagram is shown in FIG. 1 has an input terminal 1 for a multiplexed digital chrominance signal of the type 1250/2:1, with 1440 pixels per picture line and whose sampling frequency is 54 MHz. This signal alternately comprises a blue color sample referred to as "Cb" and a red color sample referred to as "Cr".

The device also has an input terminal 2 for a digital luminance signal of the type 1250/1:1, with 1440 pixels per picture line and whose sampling frequency is 108 MHz.

The input terminal 1 is connected to the input of a separating circuit 4 for separating the blue color samples Cb from the red color samples Cr. Consequently, this circuit 4 has two outputs: one for the samples Cb and one for the samples Cr. Each of these signals now comprises 720 pixels per line, sampled at 27 MHz. The signal Cb is applied to the input of a filter 5 which is a horizontal interpolation filter and which doubles the number of samples per line and the sampling frequency, and is followed by a median filter 7 which is a vertical interpolation filter and doubles the sampling frequency again. Finally, the signal is applied to a 3×3 high-pass two-dimensional filter of the "Sobel" type, which will be described hereinafter.

The signal Cr from the separating circuit 4 is subjected to the same operations in the filters 6, 8, 10 which are identical to the filters 5, 7, 9, respectively.

The amplitudes of the output signals of the Sobel filters 9 and 10 are added in an amplitude adder 11, and subsequently the resultant amplitude of the signal is divided by two in an amplitude divider 12.

The amplitude of the luminance signal from the input terminal 2 is multiplied by three in an amplitude multiplier 13 and added in an amplitude adder 14 to the amplitude of the signal from the amplitude divider 12. It is to be noted that this is possible because the two signals whose amplitudes must be added have the same sampling frequency of 108 MHz and the same number of samples per line. The resultant signal from the amplitude adder 14 is finally applied to an amplitude divider 15 which divides the amplitude by four and finally supplies a signal at an output terminal 3, which signal is to be applied to a motion estimator 16, which may be of a prior-art type.

With the amplitude signals united at the two inputs 1 and 2, the amplitude of the color signal is doubled because of the addition in the adder 11, and subsequently it is reduced to unity in the amplitude divider 12. As the amplitude of the luminance signal is multiplied by three in the multiplier 13, the luminance and chrominance signals are added together with a weighting of three to one, respectively, yielding a signal of amplitude four which is reduced to unity in the divider 15.

The divider for dividing the amplitude by four is provided to bring the signal to the level required by a prior-art estimator. It is evident that the divider 15 could be omitted if an estimator were constructed which would function with a signal which is four times larger than that required for prior-art estimators. Similarly, the values of the divisions or multiplications of the amplitude are mentioned by way of indication and may be modified, as desired, in accordance with the relative importance to be given to the luminance and chrominance components.

The Sobel filters 9 and 10 are filters whose outputs are defined by the following formula:

amplitude for the pixel $i, j = F = \sqrt{(X^2 + Y^2)}$ where X and Y have the following values:

$X = (A2 + 2*A3 + A4) - (A0 + 2*A7 + A6)$ $Y = (A0 + 2*A1 + A2) - (A6 + 2*A5 + A4)$ the samples A1, A2, A3, etc. being eight samples of the signal. The notation in FIG. 2 represents the configuration in the image of the pixels whose samples are used. The amplitude F of the sample representing the pixel at position F in the Figure is thus generated from pixels situated on the preceding line (samples A0, A1, A2) and those bordering on the position F on the same line (samples A7, A3) and finally those on the following line (samples A6, A5, A4).

In a digital application it is easy to take into account that the filter supplies a positive pulse when a signal has a rising transition in whatever direction (horizontal, vertical or diagonal), and that the filter again supplies the same pulse when the signal has a descending transition. At the output of this filter the absolute value of the contours is thus obtained, i.e. the absolute value of the derivative of the amplitude for the colored parts of the image (for the blue colored parts: at the output of filter 9 and for the red colored parts: at the output of filter 10).

FIGS. 3 to 6 show sampling patterns of the image of pixels corresponding to the samples treated in the circuits described above.

FIG. 3 illustrates the signal at the input of the separating circuit 4. The squares show samples of the blue color and the triangles show samples of the red color. The solid-line squares and triangles show the odd-field samples and the broken-line squares and triangles show the even-field samples. The sample rate is 54 MHz and there are two fields of 576 lines. The samples alternately represent the blue color and the red color and the picture is interlaced.

Figure 4:
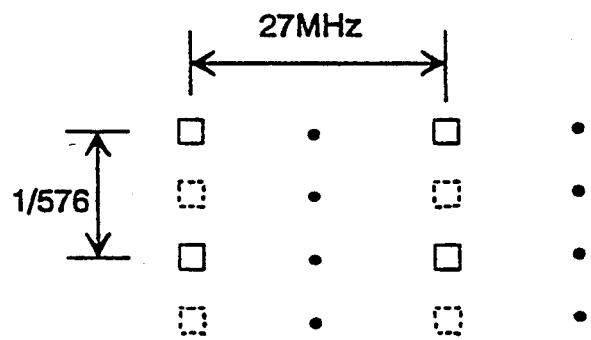

FIG. 4 shows the signal at the input of the horizontal filter 5. All the symbols are squares and solely represent blue color samples. These are simply samples shown in FIG. 3 from which the red samples have been removed: small solid circles also indicate the positions where the samples are absent. As 50% of the samples has been removed, the sampling rate is divided by two and is now 27 MHz. There are two fields of 576 lines.

Figure 5:
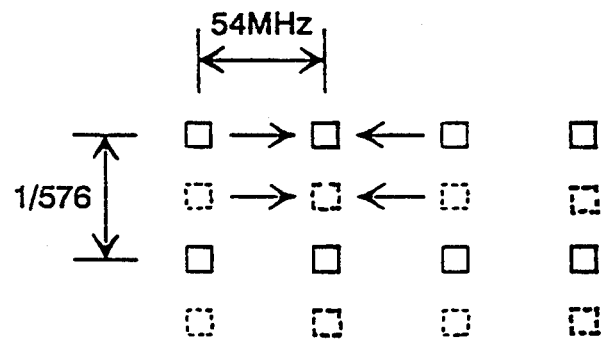

FIG. 5 illustrates the signal at the output of the horizontal filter 5. The squares in fat solid lines represent interpolated samples created by the filter on the basis of the two samples bordering on the created sample. As hereinbefore, the solid-line squares represent the odd-field samples and the broken-line squares represent the even-field samples. The sample rate is again 54 MHz and there are two fields of 576 lines.

Figure 6:
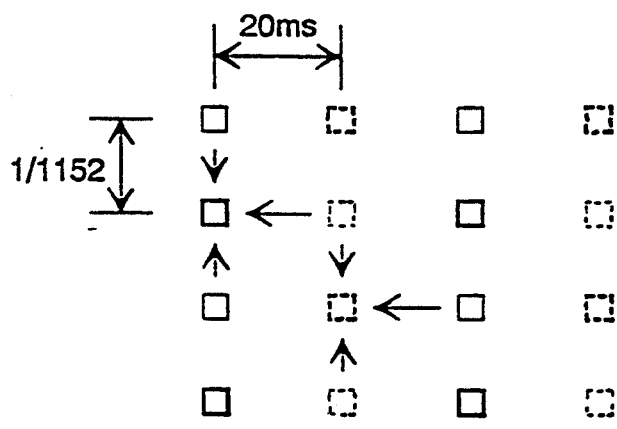

FIG. 6 illustrates the signal at the output of the vertical interpolation median filter 7. The squares are the same, but the samples in fat solid lines now represent the interpolated samples created by the filter 7. A sample from the combination of three samples, as indicated by arrows, is inserted between two samples of a field: one of the three samples comes from the preceding line of the same field, another comes from the next line of the same field and the third comes from the next position of the same line of the next field. The indication "20 ms" between two successive samples of a line denotes that these samples come from two successive fields. The sample rate of these samples is again doubled and is now 108 MHz. The representation by way of interlaced lines is replaced by a representation by way of a simple picture of 1250 lines, like the representation of the luminance.

The different circuits whose functions have been defined hereinbefore (separating circuit 4, horizontal interpolation filters 5 and 6, vertical interpolation median filters 7 and 8, high-pass two-dimensional 3×3 filters of the "Sobel" type 9 and 10) are all of types known per se and can be realised by those skilled in the art.

It is obvious that the above description with reference to a particular television system in this context is easily applicable to other systems whose characteristics, particularly those concerning the scanning mode or the number of pixels per line, or the number of components describing the color, are different.

I claim:

1. An improved method of using a motion estimator to estimate motion in an image, said image being represented by digital data comprising a luminance signal of samples at a first sampling frequency and a chrominance signal of samples at a second sampling frequency less than said first sampling frequency, said improved method comprising a method of forming an input signal for the motion estimator, comprising the steps of: converting the chrominance by interpolation into an interpolated chrominance signal of samples at the first sampling frequency, generating a composite signal from the luminance signal and the interpolated chrominance signal, and applying the composite signal to the input of the motion estimator.

2. An improved method of using a motion estimator to estimate motion in an image, said image being represented by digital data comprising a luminance signal and a chrominance signal, said improved method comprising a method of forming an input signal for the motion estimator, comprising the steps of: generating a composite signal from the luminance signal and the chrominance signal, and applying the composite signal to the input of the motion estimator, said generating step comprising the step of filtering the chrominance signal in a high-pass two-dimensional filter supplying the absolute value of the derivative of the chrominance signal.

3. A method as claimed in claim 2 wherein said high-pass two-dimensional filter is a "Sobel" filter.

4. A method as claimed in claim 2 wherein said generating step further comprises the step of bidimensionally filtering the chrominance signal in a horizontal interpolation filter and in a vertical interpolation filter.

5. A method as claimed in claim 1 wherein the chrominance signal comprises several components, and wherein each chrominance signal component is filtered in a two-dimensional filter, and in that the output signals of these two-dimensional filters are added together.

6. A method as claimed in claim 1, wherein said generating step comprises the steps of filtering said interpolated chrominance signal, and adding said filtered chrominance signal, in a weighting operation, to the luminance signal, the resultant signal being the composite signal applied to the motion estimator.

7. A device comprising a motion estimator having an input for receiving a signal which supplies information about the pixels of an image for estimating motion in this image which is represented by digital data comprising a luminance signal and a chrominance signal, wherein in that the device comprises means for extracting from the chrominance signal, elements representing contours of colored parts of the image, and means for adding these elements to the luminance signal which is applied to the motion estimator.

8. A device as claimed in claim 7, wherein said means for extracting the elements comprise at least a high-pass two-dimensional filter which supplies the absolute value of the derivative of the chrominance signal.

9. A device as claimed in claim 8, wherein the two-dimensional filter is a "Sobel" filter.

10. A device as claimed in any one of claim 7 wherein it comprises, for the chrominance signal, at least a horizontal interpolation filter and a vertical interpolation filter.

11. A device as claimed in any one of claim 8, wherein the chrominance signal comprises several components, characterized in that the device comprises a two-dimensional filter for each chrominance signal component and an adder circuit for adding the output signals of the two-dimensional filters together.

12. A device as claimed in claim 7, wherein a chrominance signal filter and an adder circuit for adding, in a weighting operation, the signals from the chrominance signal filter to the luminance signal, the resultant signal being applied to the motion estimator.

13. A method as claimed in claim 3 wherein said generating step further comprises the step of bidimensionally filtering the chrominance signal in a horizontal interpolation filter and in a vertical interpolation filter.

14. A method as claimed in claim 2, wherein the chrominance signal comprises several components, and wherein each chrominance signal component is filtered in a two-dimensional filter and in that the output signals of these two-dimensional filters are added together.

15. A method as claimed in claim 3, wherein the chrominance signal comprises several components, and wherein each chrominance signal component is filtered in a two-dimensional filter and in that the output signals of these two-dimensional filters are added together.

16. A method as claimed in claim 4, wherein the chrominance signal comprises several components, and wherein each chrominance signal component is filtered in a two-dimensional filter and in that the output signals of these two-dimensional filters are added together.

17. A device as claimed in claim 8, wherein it comprises, for the chrominance signal, at least a horizontal interpolation filter and a vertical interpolation filter.

18. A device as claimed in claim 9, wherein it comprises, for the chrominance signal, at least a horizontal interpolation filter and a vertical interpolation filter.

19. A device as claimed in claim 9, wherein the chrominance signal comprises several components, characterized in that the device comprises a two-dimensional filter for each chrominance signal component and an adder circuit for adding the output signals of the two-dimensional filters together.

20. A device as claimed in claim 10, wherein the chrominance signal comprises several components, characterized in that the device comprises a two-dimensional filter for each chrominance signal component and an adder circuit for adding the output signals of the two-dimensional filters together.

* * * * *